(12) United States Patent
Hannuksela

(10) Patent No.: US 8,457,155 B2
(45) Date of Patent: Jun. 4, 2013

(54) ENCODING AND DECODING A MULTI-VIEW VIDEO SIGNAL

(75) Inventor: Miska Matias Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 592 days.

(21) Appl. No.: 12/557,678

(22) Filed: Sep. 11, 2009

(65) Prior Publication Data

US 2011/0063409 A1 Mar. 17, 2011

(51) Int. Cl.
*H04J 3/22* (2006.01)
(52) U.S. Cl.
USPC .......................................................... 370/468
(58) Field of Classification Search
USPC ..................... 370/431–439, 464–479
See application file for complete search history.

(56) References Cited

U.S. PATENT DOCUMENTS

| | | | | |
|---|---|---|---|---|
| 6,052,124 A * | 4/2000 | Stein et al. | ...................... | 345/419 |
| 6,549,669 B1 * | 4/2003 | Sundqvist et al. | ............. | 382/238 |
| 6,859,496 B1 * | 2/2005 | Boroczky et al. | ......... | 375/240.26 |
| 7,072,393 B2 * | 7/2006 | Boice et al. | ............... | 375/240.01 |
| 2003/0198377 A1 * | 10/2003 | Ng | ................................. | 382/154 |
| 2005/0018040 A1 * | 1/2005 | Buchner et al. | ............. | 348/14.08 |
| 2005/0185712 A1 * | 8/2005 | Lee | ................................ | 375/240.1 |
| 2006/0133501 A1 * | 6/2006 | Lee et al. | .................. | 375/240.16 |
| 2006/0165169 A1 * | 7/2006 | Ng et al. | .................... | 375/240.12 |
| 2006/0222252 A1 * | 10/2006 | Lee | ................................. | 382/239 |
| 2008/0089428 A1 * | 4/2008 | Nakamura et al. | ........ | 375/240.26 |
| 2008/0240590 A1 * | 10/2008 | Moon et al. | .................... | 382/236 |
| 2009/0201992 A1 * | 8/2009 | Seo et al. | ..................... | 375/240.16 |
| 2010/0246986 A1 * | 9/2010 | Richter | ...................... | 382/248 |

FOREIGN PATENT DOCUMENTS

WO WO 2007/043775 A1 * 4/2007

\* cited by examiner

*Primary Examiner* — Jeffrey M Rutkowski
*Assistant Examiner* — Juvena Loo
(74) *Attorney, Agent, or Firm* — Alston & Bird LLP

(57) ABSTRACT

There is disclosed methods and apparatuses for multi-view video transmission and reception. The method comprises receiving a first sequence of pictures from a first view; and receiving a second sequence of pictures from a second view. The first sequence of pictures and the second sequence of pictures are divided into a first period of pictures and a second period of pictures, wherein no picture in the second period of pictures precedes any picture in the first period of pictures in output order. At least a third sequence of pictures is obtained of at least one view between the first view and the second view covering the first period of pictures. Said at least the third sequence of pictures and a first set of pictures of the first sequence of pictures and the second sequence of pictures that belong to the second period of pictures are encoded.

24 Claims, 12 Drawing Sheets

GOP0    GOP1    GOP2

ENCODING AND DECODING A MULTI-VIEW VIDEO SIGNAL

TECHNICAL FIELD

The present invention relates to compression of stereoscopic and multiview video content. It provides a method for reducing the bit rate without subjectively noticeable difference. The method utilizes one of the characteristics of the stereoscopic vision of the human visual system. The method can be applied inter alia with the present video coding standards for stereoscopic video coding.

BACKGROUND INFORMATION

Video coding standards include the recommendation H.261 of the International Telecommunication Unit's Telecommunication Standardization Sector (ITU-T H.261), the MPEG-1 Video of the International Standardization Organization's (ISO/IEC) Motion Picture Experts Group, ITU-T H.262 or ISO/IEC MPEG-2 Video, ITU-T H.263, ISO/IEC MPEG-4 Visual, ITU-T H.264, which is also known as ISO/IEC MPEG-4 AVC, the scalable video coding (SVC) extension of H.264/AVC, and the multiview video coding (MVC) extension of H.264/AVC (Advanced Video Coding). The scalable video coding extension and the multi-view video coding extensions were included in the November 2007 and March 2009 releases of ITU-T Recommendation H.264, respectively.

An encoded bitstream according to H.264/AVC or its extensions, e.g., SVC and MVC, is either a NAL unit stream, or a byte stream by prefixing a start code to each NAL unit in a NAL unit stream. A NAL unit stream is a concatenation of a number of NAL units. A NAL unit comprises a NAL unit header and a NAL unit payload. The NAL unit header contains, among other items, the NAL unit type indicating whether the NAL unit contains a coded slice, a coded slice data partition, a sequence or picture parameter set, and so on.

In H.264/AVC and its extensions, parameters that remain unchanged through a coded video sequence are included in a sequence parameter set. In addition to parameters that are essential to the decoding process, the sequence parameter set may optionally contain video usability information (VUI), which includes parameters that are very important for buffering, picture output timing, rendering, and resource reservation. There are three NAL units specified to carry sequence parameter sets, the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. A picture parameter set contains such parameters that are likely to be unchanged in several coded pictures. No picture header is present in H.264/AVC bitstreams but the frequently changing picture-level data is repeated in each slice header and picture parameter sets carry the remaining picture-level parameters. H.264/AVC syntax allows for many instances of sequence and picture parameter sets, and each instance is identified with a unique identifier. Each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data.

Coded video bitstreams may include extra information to enhance the use of the video for a wide variety purposes. For example, supplemental enhancement information (SET) and video usability information (VUI), as defined in H264/AVC, provide such a functionality. The H.264/AVC standard and its extensions include the support of supplemental enhancement information (SEI) signaling through SET messages. SET messages are not required by the decoding process to generate correct sample values in output pictures. Rather, they are helpful for other purposes, e.g., error resilience and display. H.264/AVC contains the syntax and semantics for the specified SEI messages, but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SET messages in H.264/AVC is to allow system specifications, such as 3GPP multimedia specifications and DVB specifications, to interpret the supplemental information identically and hence interoperate. It is intended that system specifications can require the use of particular SEI messages both in encoding end and in decoding end, and the process for handling SEI messages in the recipient may be specified for the application in a system specification.

In multi-view video coding, video sequences output from different cameras, each corresponding to different views, are encoded into one bit-stream. After decoding, to display a certain view, the decoded pictures which belong to that view are reconstructed and displayed. It is also possible that more than one view is reconstructed and displayed.

In the multi-view video coding pictures of a video signal can be categorized e.g. as anchor pictures or non-anchor pictures. An anchor picture is a coded picture in which all slices reference only slices with the same temporal index, i.e., only slices in other views and not slices in earlier pictures of the current view. An anchor picture can be signaled by setting a parameter anchor_pic_flag to a first value such as the logical 1. After decoding the anchor picture, all following coded pictures in display order shall be able to be decoded without inter-prediction from any picture decoded prior to the anchor picture. If one view component of a coded picture is an anchor view component, then all other view components of the same coded picture are also anchor view components. Consequently, decoding of any view can be started from a temporal index that corresponds to anchor pictures. If a picture is a non-anchor picture, the parameter anchor_pic_flag is set to a second value, such as the logical 0.

One of the problems in stereoscopic video coding is the expansion of the bit rate compared to conventional single-view video. Even with the inter-view prediction techniques provided by the multi-view video coding, the bit rate of a stereo video bit stream is often close to double of that compared to the respective single-view bit stream. Such a bit rate increase is many times not acceptable when trading off transmission throughput or storage space requirements with the expected volume of devices capable of viewing stereoscopic content. Hence, methods to achieve additional compression remain a big challenge in stereoscopic and multi-view video coding.

SUMMARY

The invention is utilizing the fact that the human visual system seems to require an adjustment period after a scene cut before the stereoscopic vision starts to operate. It has been found that when the disparity between the left and right views of the stereoscopic content is fairly limited (i.e., the presented depth range is fairly limited), the stereoscopic content can be replaced by monoscopic (single-view) content during a small period of time after a scene cut without being noticeable. This phenomenon can be utilized in stereoscopic video coding: a single view is coded after a scene cut during a small period of time before switching to conventional stereoscopic video coding. Consequently, the required bit rate is reduced during this period of time following a scene cut.

A scene cut or a scene change means a situation in which there is a discontinuity in the image content of two successive pictures which can be due to, for example, a change in the direction the cameras are pointed to.

According to a first aspect of the present invention there is provided a method for a device comprising receiving a first sequence of pictures from a first view and receiving a second sequence of pictures from a second view, the first sequence of pictures and the second sequence of pictures covering a second period of pictures;

obtaining at least a third sequence of pictures of at least one view between the first view and the second view covering a first period of pictures;

wherein no picture in the second period of pictures precedes any picture in the first period of pictures in output order;

encoding said at least the third sequence of pictures; and encoding the first sequence of pictures and the second sequence of pictures.

According to a second aspect of the present invention there is provided a method for a device comprising:

receiving an encoded sequence of pictures from at least one view among a first view, a second view and at least one third view between the first view and the second view;

decoding said encoded sequence of pictures;

examining whether said encoded sequence of pictures represents said at least one third view; and if the examining indicates that said encoded sequence of pictures represents said at least one third view, generating a rendered first view and a rendered second view on the basis of said decoded sequence of pictures.

According to a third aspect of the present invention there is provided an apparatus comprising:

an input configured for receiving a first sequence of pictures from a first view; and receiving a second sequence of pictures from a second view, the first sequence of pictures and the second sequence of pictures covering a second period of pictures;

a first element configured for obtaining at least a third sequence of pictures of at least one view between the first view and the second view covering a first period of pictures, wherein no picture in the second period of pictures precedes any picture in the first period of pictures in output order;

an encoder configured for encoding said at least the third sequence of pictures; and encoding the first sequence of pictures and the second sequence of pictures.

According to a fourth aspect of the present invention there is provided an apparatus comprising:

an input configured for receiving an encoded sequence of pictures from at least one view among a first view, a second view and at least one third view between the first view and the second view;

a decoder configured for decoding said encoded sequence of pictures;

an examining element configured for examining whether said encoded sequence of pictures represents said at least one third view; and a generator configured for generating a rendered first view and a rendered second view on the basis of said decoded sequence of pictures, if the examining indicates that said encoded sequence of pictures represents said at least one third view.

According to a fifth aspect of the present invention there is provided a computer program product having a program code stored therein, said program code comprising instructions when executed by a processor performs the following:

receiving a first sequence of pictures from a first view and receiving a second sequence of pictures from a second view, the first sequence of pictures and the second sequence of pictures covering a second period of pictures;

obtaining at least a third sequence of pictures of at least one view between the first view and the second view covering a first period of pictures;

wherein no picture in the second period of pictures precedes any picture in the first period of pictures in output order;

encoding said at least the third sequence of pictures; and encoding the first sequence of pictures and the second sequence of pictures.

According to a sixth aspect of the present invention there is provided a computer program product having a program code stored therein, said program code comprising instructions when executed by a processor performs the following:

receiving an encoded sequence of pictures from at least one view among a first view, a second view and at least one third view between the first view and the second view;

decoding said encoded sequence of pictures;

examining whether said encoded sequence of pictures represents said at least one third view; and if the examining indicates that said encoded sequence of pictures represents said at least one third view, generating a rendered first view and a rendered second view on the basis of said decoded sequence of pictures.

According to a seventh aspect of the present invention there is provided an apparatus comprising:

means for receiving a first sequence of pictures from a first view; and for receiving a second sequence of pictures from a second view, the first sequence of pictures and the second sequence of pictures covering a second period of pictures;

means for obtaining at least a third sequence of pictures of at least one view between the first view and the second view covering a first period of pictures, wherein no picture in the second period of pictures precedes any picture in the first period of pictures in output order;

means for encoding said at least the third sequence of pictures; and means for encoding the first sequence of pictures and the second sequence of pictures.

According to an eighth aspect of the present invention there is provided an apparatus comprising:

means for receiving an encoded sequence of pictures from at least one view among a first view, a second view and at least one third view between the first view and the second view;

means for decoding said encoded sequence of pictures;

means for examining whether said encoded sequence of pictures represents said at least one third view; and means for generating a rendered first view and a rendered second view on the basis of said decoded sequence of pictures, if the examining indicates that said encoded sequence of pictures represents said at least one third view.

The invention may decrease the amount of information to be transmitted when a multi-view video is encoded and transmitted between devices.

DETAILED DESCRIPTION OF SOME EMBODIMENTS

Figure 3:
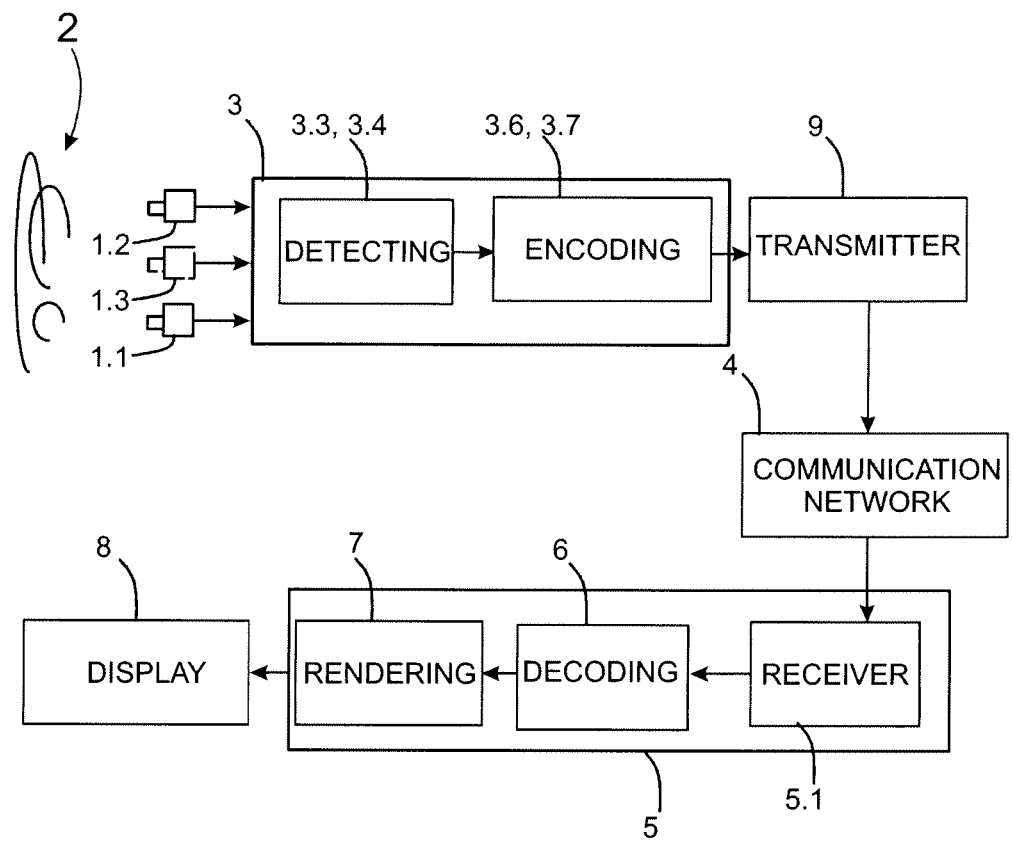
FIG. 3 depicts an example of a video transmission system in which the present invention can be applied.

In the following the invention will be described in connection with a video transmission system of FIG. 3. In this example the video transmission system uses a multi-view video coding technology (MVC) but is not limited to such systems only. The system comprises two or more video capturing devices 1.1, 1.2 which are located at different positions so that they capture the target scene 2 from a slightly different position. The video capturing devices 1.1, 1.2 are, for example, video cameras or they can also be some kind of memory devices from which video signal with different views can be reproduced. The video signals from the video capturing devices 1.1, 1.2 can be provided to an encoder 3 for encoding. The encoder 3 can be, for example, a multi-view video coding encoder or another encoder which is capable of encoding two or more views. It is also possible that two or more separate encoders can be used, one for each view. The encoder 3 encodes the video signals and forms a multi-view encoded signal. The multi-view encoded signal can be transmitted via a communication network 4 or directly to one or more other devices 5 for decoding and displaying, and/or the multi-view encoded signal can be stored to a data carrier such as a digital versatile disk (DVD), to a semiconductor memory, etc. The other device 5 can decode the signal and display it on the display 8, for example.

The encoder 3 can comprise a processor 3.10 or other controller for controlling the operation of the encoder 3. The encoder 3 can also comprise memory 3.11 for storing data, program code etc. The operations of the encoder can be implemented partly by hardware and partly by software. For example, some of the operational elements of the encoder 3 can be implemented as a program code which, when executed by the processor 3.10, perform the operations of the operational elements.

Respectively, the other device(s) 5 can comprise a processor 5.2 or other controller for controlling the operation of the device 5. The device 5 can also comprise memory 5.3 for storing data, program code etc. The operations of the device can be implemented partly by hardware and partly by software. For example, some of the operational elements of the device 5 can be implemented as a program code when executed by the processor performs the operations of the operational elements.

Figure 11:
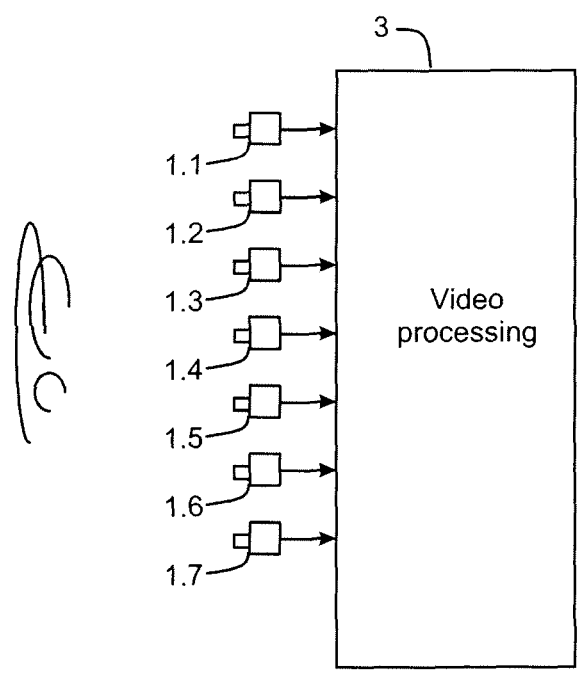
FIG. 11 depicts an example of a multi-view arrangement.

The system can comprise more than two video capturing devices 1.1, 1.2. An example of such a multi-view arrangement is depicted in FIG. 11 in which seven video capturing devices 1.1-1.7 are shown. The video capturing devices 1.1-1.7 can be organized in pairs (stereo pairs) so that one video capturing device of each pair can capture a left view and the other video capturing device of each pair can capture a right view. For example, video capturing devices 1.1 and 1.3 of FIG. 7 can form a first pair, video capturing devices 1.2 and 1.4 can form a second pair, video capturing devices 1.3 and 1.5 can form a third pair, video capturing devices 1.4 and 1.6 can form a fourth pair, and video capturing devices 1.5 and 1.7 can form a fifth pair.

Such a multi-view system enables a wide viewing angle wherein the user can move or turn his/her head to a different angle and see the target from a different location and may even see behind an object in the scene by moving to a different location with respect to the display 8. This functionality can be achieved by decoding different views by the device 5 and using a special type of display 8.

In the following the invention will be explained using one pair of video capturing devices 1.1, 1.2 and, optionally, a third video capturing device 1.3 for providing a start-up sequence. Hence, the first video capturing device 1.1 forms the left view and the second video capturing device 1.2 forms the right view.

The controller 3.10 or other element of the encoder 3 can control the video capturing devices 1.1, 1.2 to capture pictures substantially simultaneously so that the left and right view and in systems with more than two views the pictures of each view represent the same moment of time. It is also possible that one of the video capturing devices 1.1, 1.2 operates as a master device and controls the capturing moments of the other video capturing devices 1.1, 1.2.

The encoder 3 uses a predictive encoding method to reduce the amount of information to be transmitted. The video signals contain series of pictures of the target scene 2 (a video sequence) captured at different moments of time. The encoder 3 does not encode each picture as such but may utilize similarities between successive pictures to form predicted pictures. Information of the picture(s) from which the predicted picture is formed is also needed to decode the predicted pictures whereas decoding of instantaneous decoding refresh pictures (IDR) needs no information from other pictures. When there is a discontinuity in the video sequence (e.g. a scene cut) the encoder 3 typically inserts an IDR picture or an anchor picture into the encoded picture stream. The encoder 3 may also insert IDR pictures and/or anchor pictures at regular intervals to the encoded picture stream although there were no significant changes in the contents of the video sequence. This is done inter alia to enable the decoder to start decoding in the middle of the picture stream.

The predicted picture may be formed by using one or more reference pictures in the prediction. The reference picture may be temporally (in output order) earlier in the video sequence than the predicted picture or the reference picture may also succeed the predicted picture in output order. Hence, the decoding order of the pictures may not be the same than the display or output order of the pictures. Further, the transmission order of the encoded pictures may differ from the decoding order and/or the display order of the pictures.

Figure 1:
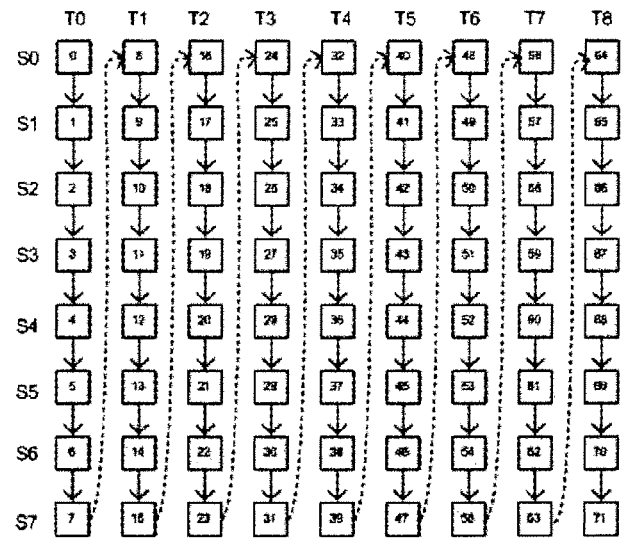
FIG. 1 depicts an example of a decoding order of a multi-view video coding

An example of a decoding order (i.e. bit stream order) of a multi-view video coding is shown in FIG. 1. The decoding order arrangement is referred as a time-first coding. Each access unit is defined to contain one primary coded picture, which in turn contains the coded view components of all the views for one output time instance. Decoding of a coded view component typically results into one decoded picture. The decoding order of access units may not be identical to the output or display order. The access units are depicted as numbered rectangles in FIG. 1. The rows labelled as S0 to S7 depict different views and the columns T0 to T8 depict different time instances.

Figure 2:
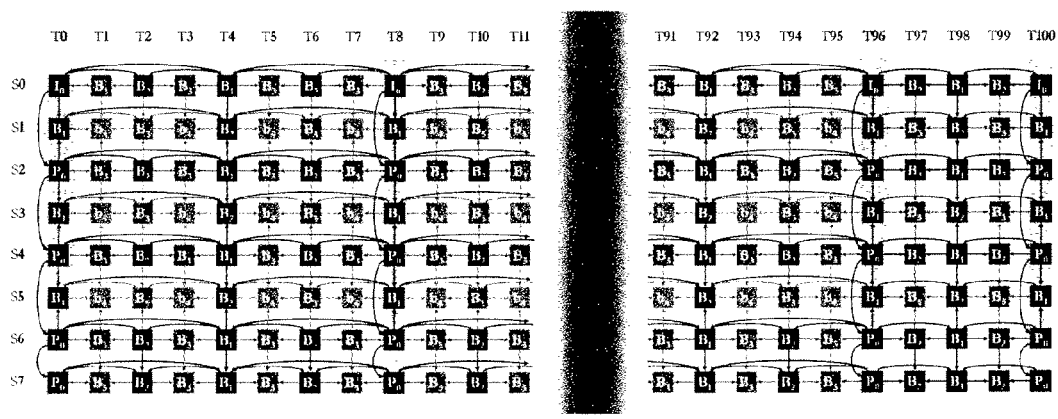
FIG. 2 depicts an example of a prediction structure for multi-view video coding.

An example of a prediction structure for multi-view video coding is shown in FIG. 2, where predictions are indicated by arrows, the pointed-to object using the point-from object for prediction reference. In this example the prediction includes both inter-picture prediction within each view and inter-view prediction i.e. prediction can also occur between different views.

Figure 4:
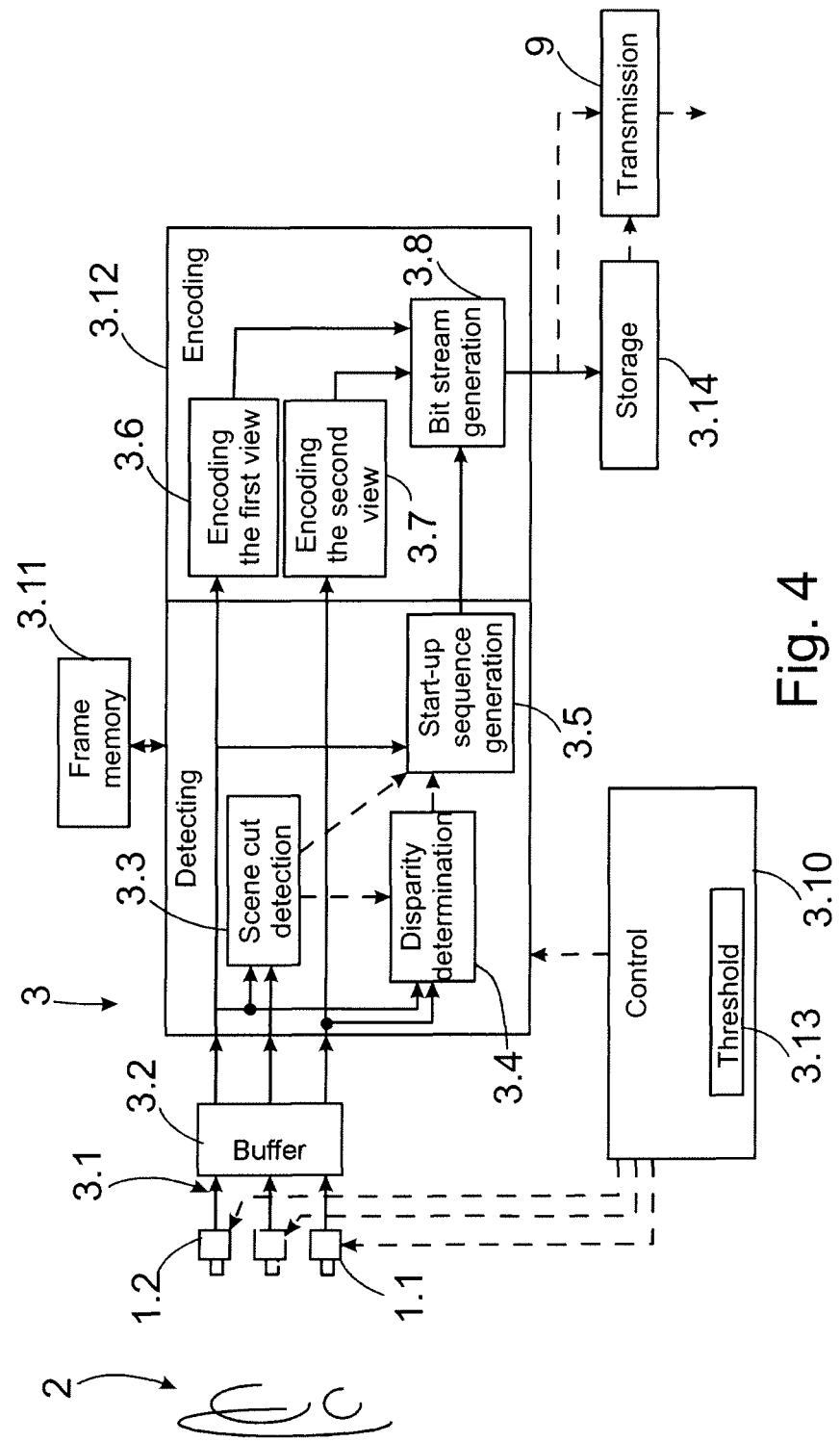
FIG. 4 depicts an example embodiment of an encoding apparatus according to the present invention.

An example embodiment of the encoder 3 is depicted in FIG. 4. The encoder 3 comprises an input 3.1 for inputting video signals from two or more video capturing devices 1.1, 1.2. The encoder 3 can also comprise a pre-encoder buffer 3.2 for buffering video signals from the video capturing devices 1.1, 1.2 before encoding, if necessary. The pre-encoder buffer 3.2 may also be used for storing information of reference pictures or a frame memory 3.11 of the encoder 3 may also be used as storing information of reference pictures. The encoding module 3.12 of the encoder 3 forms two or more views from the video signals of the video capturing devices 1.1, 1.2.

The encoder 3 also comprises a scene cut detector 3.3 which determines when it may be desirable to encode a start-up video sequence according to the present invention. In this connection the start-up video sequence means that after a scene cut video information of one view is encoded instead of encoding two or more views. There can also be a disparity detector 3.4 to determine, when the scene cut detector 3.3 has detected a scene cut, whether the disparity between the first and the right view is such that the transmission of the start-up sequence can be performed without deteriorating the subjective quality of the decoded video sequence too much. It may happen that if the disparity is too large, the viewer might notice that the number of coded views is reduced.

The start-up sequence generator 3.5 generates a start-up sequence if the scene cut detector 3.3 has signaled a scene cut and, when applicable, the disparity detector 3.4 has determined that the disparity does not prevent the encoding of the start-up sequence. Even though the start-up sequence generator 3.5 is depicted as a separate block in FIG. 4, the operation of the start-up sequence generator may also take place in one of the encoding blocks used for encoding the left view, the right view, or any other view of a multi-view video signal.

The encoder 3 may also comprise a first encoding block 3.6 for encoding the video signal from the first video capturing device 1.1 i.e. the left view, and a second encoding block 3.7 for encoding the video signal from the second video capturing device 1.2 i.e. the right view. However, the invention can also be applied in connection with devices which use the same encoding block for encoding both the left view and the right view. It is also possible that there are more than two encoding blocks 3.6, 3.7 when the multi-view coding uses more than two views.

The bit stream generator 3.8 compiles the bit stream for transmission by the transmitter 9 and/or for storing by the storage unit 3.14 from the encoded view and, optionally, from the start-up sequence. The transmitter 9 performs the necessary steps for transmitting the bit stream to a transmission channel, such as the communication network 4. The storage unit 3.14 can store the bit stream to a storage medium such as a DVD, a memory device, etc. The transmitter 9 may comprise a channel encoder and other means for transforming the bit stream and other information to transmission signals for the communication network 4.

In one embodiment, the encoder 3 generates both the start-up sequence (using the start-up sequence generator 3.5) and a regular coded multi-view video signal (using the encoding blocks 3.6 and 3.7) for the pictures captured during the start-up sequence period. The start-up sequence and the regular coded multi-view video signal may be indicated to be alternatives to each other in the storage or transmission format. For example, pictures in the start-up sequence may be coded as redundant coded pictures. If both the start-up sequence and the regular coded multi-view video signal are present for the start-up duration, the transmitter 9 (FIG. 4) or the sender 130 (FIG. 13) may transmit only one of them. The transmitter 9 or the sender 130 may estimate the available network throughput and decide to send the start-up sequence if the network throughput is not sufficient for sending the regular coded multi-view video signal in real-time. If both the start-up sequence and the regular coded multi-view video signal are present for the start-up duration, the decoder (3 in FIG. 3, 160 in FIG. 13) can decode only one of them. If a sufficient amount of computational and memory resources is estimated to be available, the decoder can decode the regular coded multi-view video signal during the start-up sequence period; otherwise, it can decode the start-up sequence.

In addition to the bit stream containing the video information the transmitter 9 may also transmit signaling information to the communication network 4. The signaling information can comprise SEI messages, for example.

Figure 6:
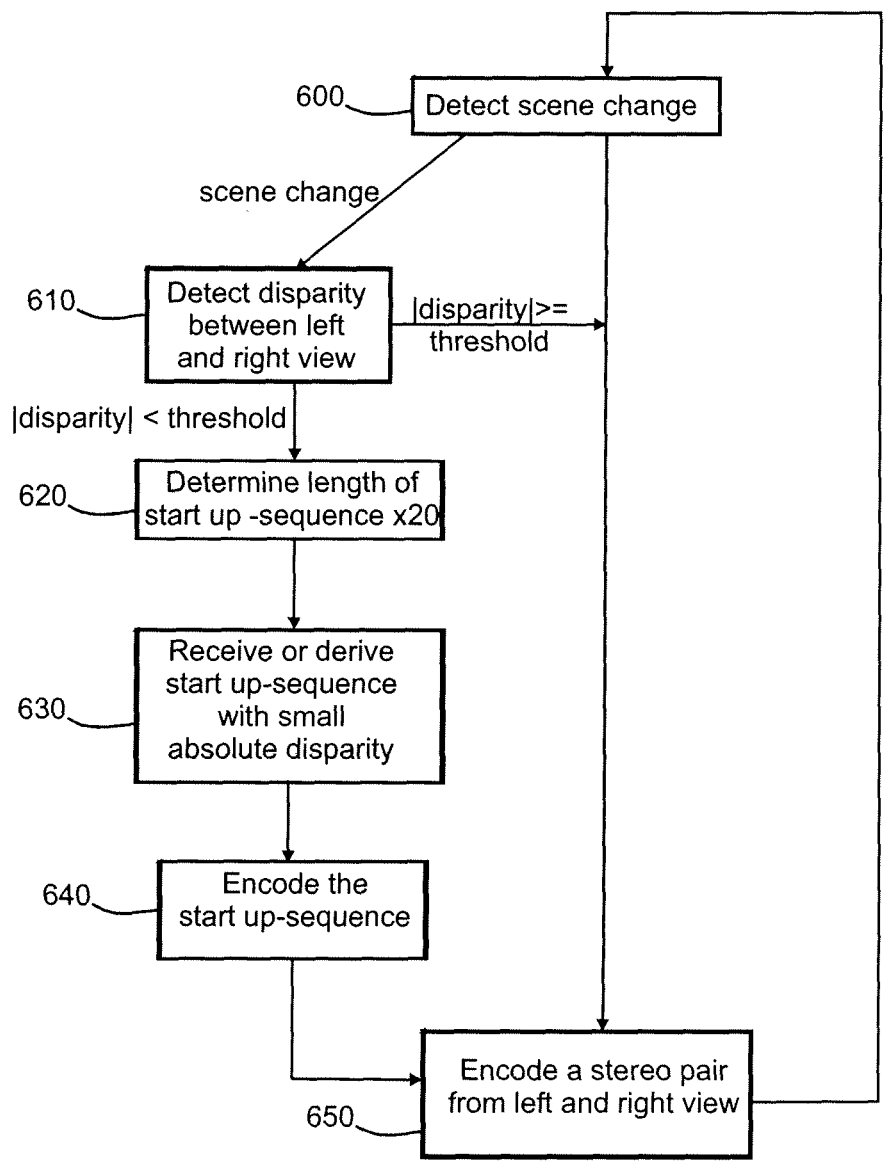
FIG. 6 depicts an example embodiment of an encoding method according to the present invention as a flow diagram.

In the following the operation of the encoder according to an example embodiment will be described in more detail with reference to the encoder of FIG. 4 and the flow diagram of FIG. 6. It is assumed that there are two views i.e. it is a stereoscopic video system. In a normal operation, the encoder 3 receives pictures from a left view and a right view. The pictures may originate from a stereoscopic camera arrangement, where two video capturing devices 1.1, 1.2, e.g. cameras, are placed next to each other.

The first video capturing device 1.1 and the second video capturing device 1.2 capture sequences of pictures at certain intervals, for example 25 or 30 pictures per second, or if interlacing is in use, 50 or 60 fields per second. However, also other picture rates can be used. The video capturing devices 1.1, 1.2 comprise an imaging element (not shown) such as a charge-coupled device (CCD) or a CMOS cell. The imaging elements can comprise one or more pixel matrices which transform the illumination to an electrical signal. This electrical signal can be measured and converted to digital samples by an analogue-to-digital converter (not shown). Each pixel of the imaging element represents a part of the picture wherein the digital samples of all the pixels represent the whole picture.

The digital samples from the video capturing devices 1.1, 1.2 can be stored to the buffer 3.2, if necessary. The scene cut detector 3.3 can read at least part of the pixel values from one or more of the video capturing devices 1.1, 1.2 to determine whether there is a scene cut or other occurrence in the video sequence which could initiate the transmission of the start-up sequence. This is depicted as the block 600 in FIG. 6.

In block 600, it is detected whether a scene cut or scene change occurred in the present stereo pair of pictures to be encoded. Any scene cut detection algorithm can be used or information about a scene cut can be received by external means (not shown). For example, a comparison of luma histograms of a previous encoded picture and the present picture to be encoded can be performed and a scene cut detected if the histograms differ to a remarkable amount. It is noted that the scene cut detection may be performed only for one of left and right views. An example of information by external means is an indication from a video editing equipment or software (not shown). In addition, the invention is applicable to other types of scene changes than cuts, and any detection algorithm for gradual scene changes can be applied.

If a scene change was detected in block 600, the disparity detector 3.4 determines the disparity between the left view and the right view or it can be concluded otherwise (block 610). The disparity can be detected with any depth estimation algorithm. One or more stereo pairs can be used for depth estimation. Stereo pairs prior to the present one can be used if it is known that the depth range of the objects in the scene has not changed essentially. Stereo pairs subsequent to the present one can additionally be used to achieve more robustness or when the depth range of the objects in the scene can change essentially. Alternatively, the maximum absolute disparity can be concluded based on a known baseline separation of the cameras respective to the left and right views and a known depth range of objects in the scene.

Disparity refers to the displacement of a pixel in one view relative to the respective pixel in an adjacent view. One possibility to determine the disparity is to find out similar objects or pixel blocks in the left and right views and to determine the difference of the location of these objects or pixel blocks in different views.

It is possible to code and transmit depth maps and to use depth-image-based rendering to generate novel intermediate views in a receiving device. Depth-image-based rendering is also known as view synthesis.

A disparity map between two frames can be converted to a depth map or vice versa when the parameters of the video capturing devices 1.1, 1.2 are known.

The disparity detector 3.4 can then compare the detected or concluded disparity with one or more threshold values 3.13. The threshold values can be pre-determined in the encoder 3 or they can be determined by the end-user who is using the receiving device for decoding and displaying the encoded bit stream, or can be selected according to the rendering (receiving) device in use or expected to be used for displaying the encoded bit stream. If the receiving device 5 defines the threshold value(s) for the disparity, the receiving device 5 can transmit the threshold value(s) to the encoding device 3 by some appropriate method.

In an example embodiment a maximum absolute disparity value is compared with a single threshold value. If the maximum absolute disparity is smaller than a threshold value, the encoding process continues with steps 620, 630, and 640. Otherwise, the encoding process continues with step 650.

In block 620, the start-up sequence generator 3.5 determines the length of a start-up sequence in terms of number of stereo pairs or duration, for example. The length of the start-up sequence can be a pre-determined constant or it can be set according to the characteristics of the content to be encoded, such as the detected or concluded disparity. Alternatively, the length of the start-up sequence may be determined according to a desired compression ratio and a determination algorithm for trading off quality and bit rate between different options to achieve compression. Alternatively, the length of the start-up sequence may be determined by the end-user receiving the encoded bit stream.

In block 630, the pictures for the start-up sequence are either received or derived by the start-up sequence generator 3.5. The pictures for the start-up sequence can be received from a camera array arrangement, where in addition to the cameras for the left view and the right view, there is at least a third video capturing device 1.3, for example in between the first 1.1 and the second video capturing device 1.2. The pictures for the start-up sequence can be gotten from the third video capturing device 1.3. Alternatively, the pictures for the start-up sequence can be synthesized based on the pictures from the left view and/or the right view during the start-up sequence i.e. from the video sequences from the first video capturing device 1.1 and/or from the second video capturing device 1.2. Any view synthesis algorithm can be used for the derivation of the pictures for the start-up sequence. Alternatively, one of the views in the start-up sequence can originate from the third camera 1.3, whereas the other one can be view-synthesized.

In different embodiments of the invention, the start-up sequence contains
 pictures from a single view,
 pictures from a single view and associated depth map, or
 pictures from two views whose camera separation and hence the absolute disparity is smaller than those of the left and right views.

It is noted that in case of view-synthesized pictures in the start-up sequence, the camera separation is virtual.

In addition to the coded texture view or views for the start-up sequence, respective depth map images or disparity map images can be coded for the pictures in the start-up sequence.

In different embodiments of the invention, the camera separation and hence the (average) absolute disparity in the start-up sequence stays constant or is gradually increasing in output order of stereo pairs.

In block 640, the start-up sequence is encoded by the start-up sequence generator 3.5. Different arrangements for encoding of the start-up sequence are presented later in this specification. These arrangements apply to the cases where the start-up sequence to be compressed contains a single view of texture video. Generally, any multi-view coding scheme can be used in block 640, such as MVC or the H.264/AVC SEI messages for stereoscopic video.

When the start-up sequence has been encoded, or when no scene change has occurred, or when a scene change has occurred but the disparity of the left and right views is considered too large, a stereo pair originating from the left view and the right view is coded conventionally in block 650 by the respective encoding modules 3.6 and 3.7. The process is then continued by proceeding to the next stereo pair, if any, to be encoded and switching to block 610.

In the following it is assumed that the encoder encodes stereoscopic content i.e. video sequences from two video capturing devices 1.1, 1.2. The encoding method can be, for example, H.264/AVC. The encoder 3 can indicate that the encoded bit stream contains stereoscopic video sequences by using some appropriate signaling method, for example by using certain supplemental enhancement information (SEI) messages. The stereo video information SEI message can be used to indicate that a top field or a bottom field is a picture for the left view or the right view or that a picture associated with the message is a left view or a right view. A frame packing arrangement SEI message allows the indication of different spatial multiplexing techniques for stereoscopic content into H.264/AVC coded pictures, such as column interleaving or row interleaving.

In the following some options for coding a single-view start-up sequence are presented. The following arrangements are depicted in FIGS. 7a, 7b-10.

Figure 7A:
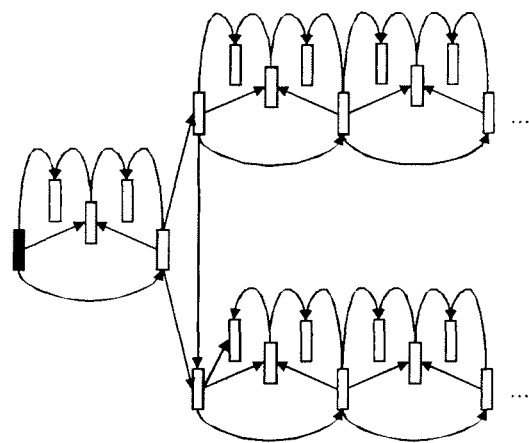
FIGS. 7a and 7b depict an example of coding a single-view start-up sequence using a conventional coding order.
Figure 7B:
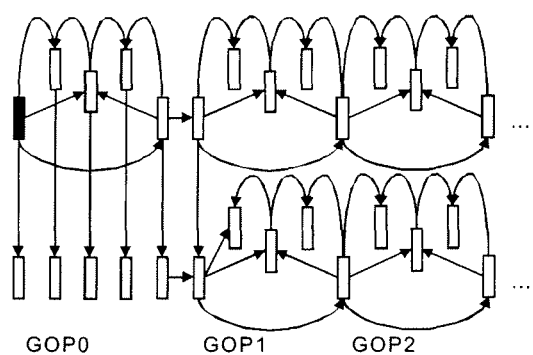

In FIGS. 7a and 7b a conventional coding order is used. FIG. 7a depicts the original pictures to be encoded and their prediction relations, and FIG. 7b depicts the pictures at the decoding phase i.e. in the decoding device 5 when the video sequences are rendered. The intra picture is the first picture after the scene change and the predicted picture follow the intra picture in a normal order.

Figure 8A:
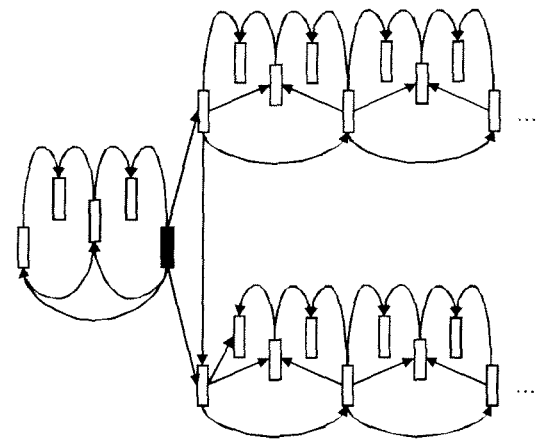
FIGS. 8a and 8b depict an example of coding a single-view start-up sequence using intra picture postponement in the middle view.
Figure 8B:
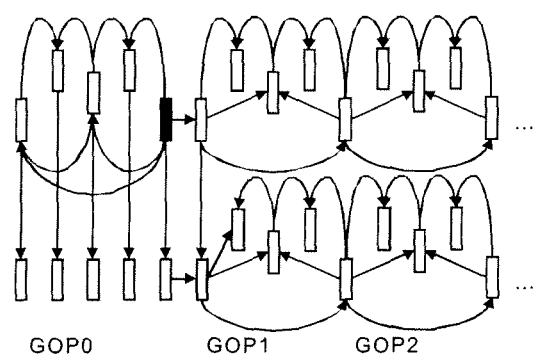

In FIGS. 8a and 8b intra picture is postponed in the middle view. FIG. 8a depicts the original pictures to be encoded and their prediction relations, and FIG. 8b depicts the pictures at the decoding phase.

Figure 9A:
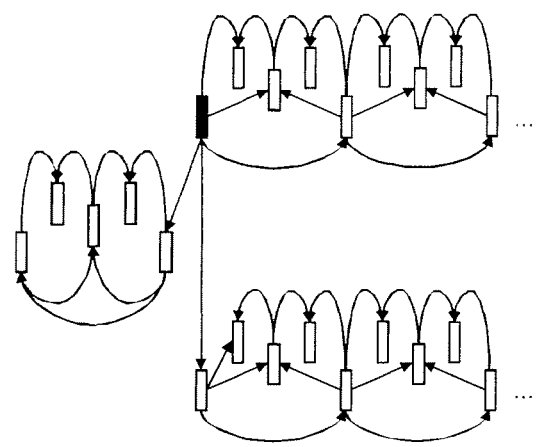
FIGS. 9a and 9b depict an example of coding a single-view start-up sequence using intra picture postponement in the left view.
Figure 9B:
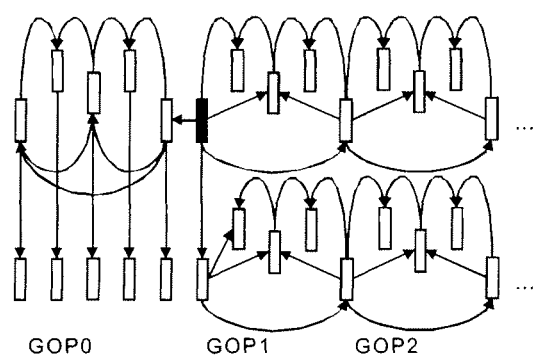

In FIGS. 9a and 9b a third example is depicted in which intra picture is postponed in the left view. FIG. 9a depicts the original pictures to be encoded and their prediction relations, and FIG. 9b depicts the pictures at the decoding phase.

Figure 10:
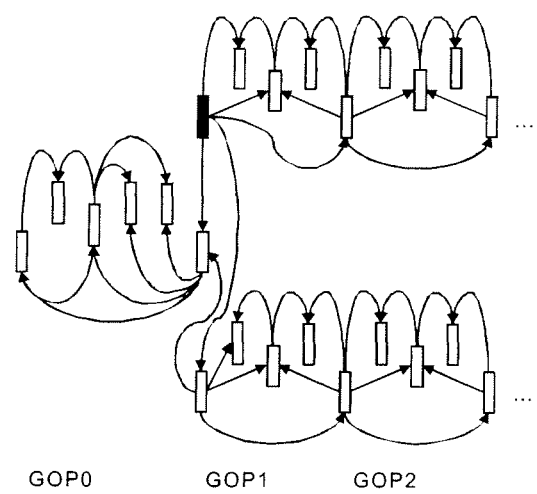
FIG. 10 depicts an example of coding a single-view start-up sequence using a predictive coding of the middle view.

FIG. 10 depict a fourth example in which predictive coding of the middle view is used. FIG. 10 depicts the original pictures to be encoded and their prediction relations.

In FIGS. 7a, 7b-10 solid black rectangles are IDR view components and hollow rectangles indicate any other types of view components. The root of an arrow indicates the reference for inter or inter-view prediction whereas the head of an arrow indicates the destination of inter or inter-view prediction (i.e., the view component being decoded at that moment). The output order of view components is ascending from left to right in FIGS. 7a, 7b-10.

In FIGS. 7a, 7b-10 only three groups of pictures (GOP) are depicted but in practice there can be more than three groups of pictures in a multi-view video sequence. The length of the groups of pictures (GOP length) in the presented figures has been selected to be four (or five for the very first group of pictures), but any other GOP length could he used too. However, the duration of the very first GOP is limited by the capability of the human visual system to detect that the sequence is not stereoscopic after a scene cut. The anchor access unit frequency can be selected freely. A normal cascaded quantizing step size parameter (QP) setting can be used.

FIGS. 7a, 7b; 8a, 8b; and 9a, 9b present schemes that can be coded with MVC, whereas FIG. 10 present a scheme which is not MVC compatible currently.

As illustrated in FIGS. 7a, 7b; 8a, 8b; and 9a, 9b, the invention can be realized within the multi-view coding standard by coding two views for the start-up sequence from a single input view. View 1 in the start-up sequence is simply inter-view predicted from view 0 and no prediction error is coded. This arrangement causes some amount of redundant data as the indication of coding mode and the lack of prediction error data is done macroblock by macroblock for the coded pictures in view 1. Therefore, in one embodiment of the invention, the presence of the initial start-up sequence is indicated in a more efficient manner in a higher level in the hierarchy of code words.

The indication of whether or not a coded data unit belongs to a start-up sequence can be included in any header or a common data structure for coded picture data. Header structures that can contain the indication include a slice header, a picture header, a group of pictures header, and a sequence header. Common data structures that can contain the indication include a picture parameter set and a sequence parameter set. If a header or a common data structure covering more than one access unit is used for conveying the indication, the indication should be accompanied by another syntax element indicating which access units are a part of the start-up sequence. For example, the syntax element can be an access unit count of those access units that belong to the start-up sequence starting from the beginning of the access unit sequence where the header or the common data structure becomes effective.

In one embodiment of the invention, the indication of whether or not a coded data unit belongs to a start-up sequence is implicit: if one of the views (usually the non-base view) is absent, the access unit is a part of the start-up sequence. This embodiment can be additionally accompanied by means of detecting the use of a startup sequence from an unintentional loss of coded view components. For example, an indication of the use of a start-up sequence (similar to those presented in the previous paragraph) can be included in the bit stream as a Supplemental Enhancement Information (SEI) message, included in a meta data or description structures of the file format encapsulating the coded bit stream, or included in a header structure, such as in the RTP payload header, used in the encapsulation or transport of the coded bit stream. The decoder, file format parser, or the transport decapsulator should detect the use of the start-up sequence or an unintentional loss of view components from the indication.

Alternatively or in addition, the coded view components may be associated with a numbering scheme that enables the detection of an unintentionally lost view component. Any of the headers or common data structures presented, or the encapsulation headers or meta data structures presented in the previous paragraphs may be used to convey a sequence number of a coded view component (usually relative to the start of the sequence after the previous anchor access unit or IDR access unit) or an identifier of a previous coded view component or both. The sequence number follows a pre-determined ordered series, such as an arithmetic series with a wrap-over after a certain maximum value. The sequence number of reference access units may be independent of non-reference access units—similarly to the frame_num syntax element of H.264/AVC. The sequence number for each temporal_id or temporal level may be independent. An independent instance of the sequence number may exist for each view, in which case the sequence number of the non-coded view could have a value indicating "no coded view components present since the scene cut" or could indicate the view component prior to the scene cut. The identifier of the previous coded view component can be the value of frame_num syntax element, the pair of the idr_pic_id and frame_num syntax elements, or the sequence number, for example. The identifier of the previous coded view component can indicate the previous view component in the temporal hierarchy that is required as a reference for the present view component which the identifier is associated with. The decoder could detect an unintentional loss of a view component, when there is a gap in the sequence number compared to the pre-determined ordered series. Alternatively or in addition, the decoder could detect an unintentional loss of a view component if the indicated previous coded view component is not present. In one embodiment of the invention, the identifier of the next view component is conveyed instead of or in addition to the identifier of the previous view component.

Figure 5:
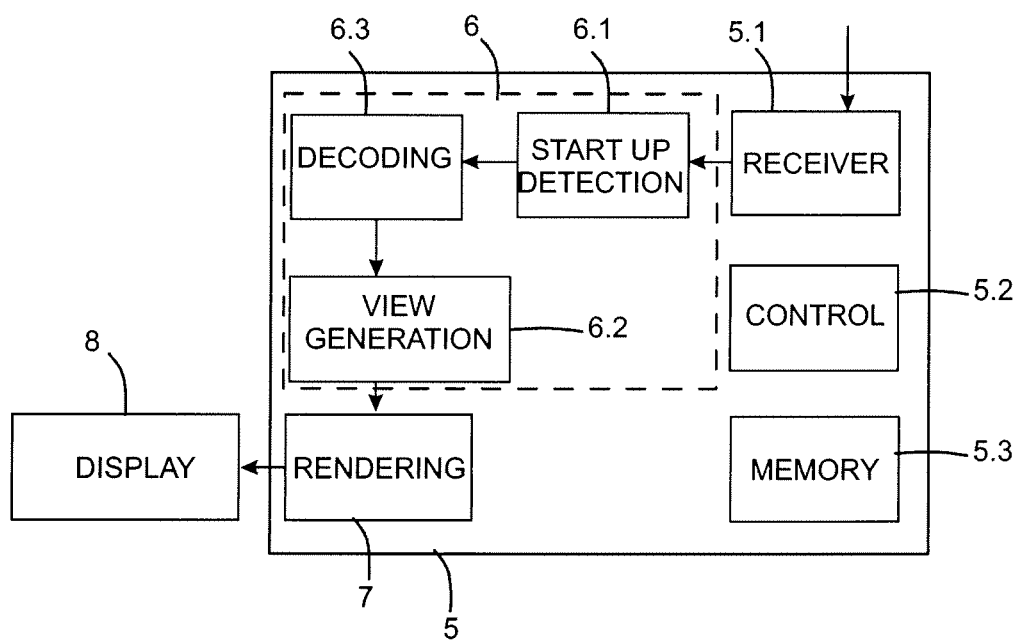
FIG. 5 depicts an example embodiment of a decoding apparatus according to the present invention.
Figure 12:
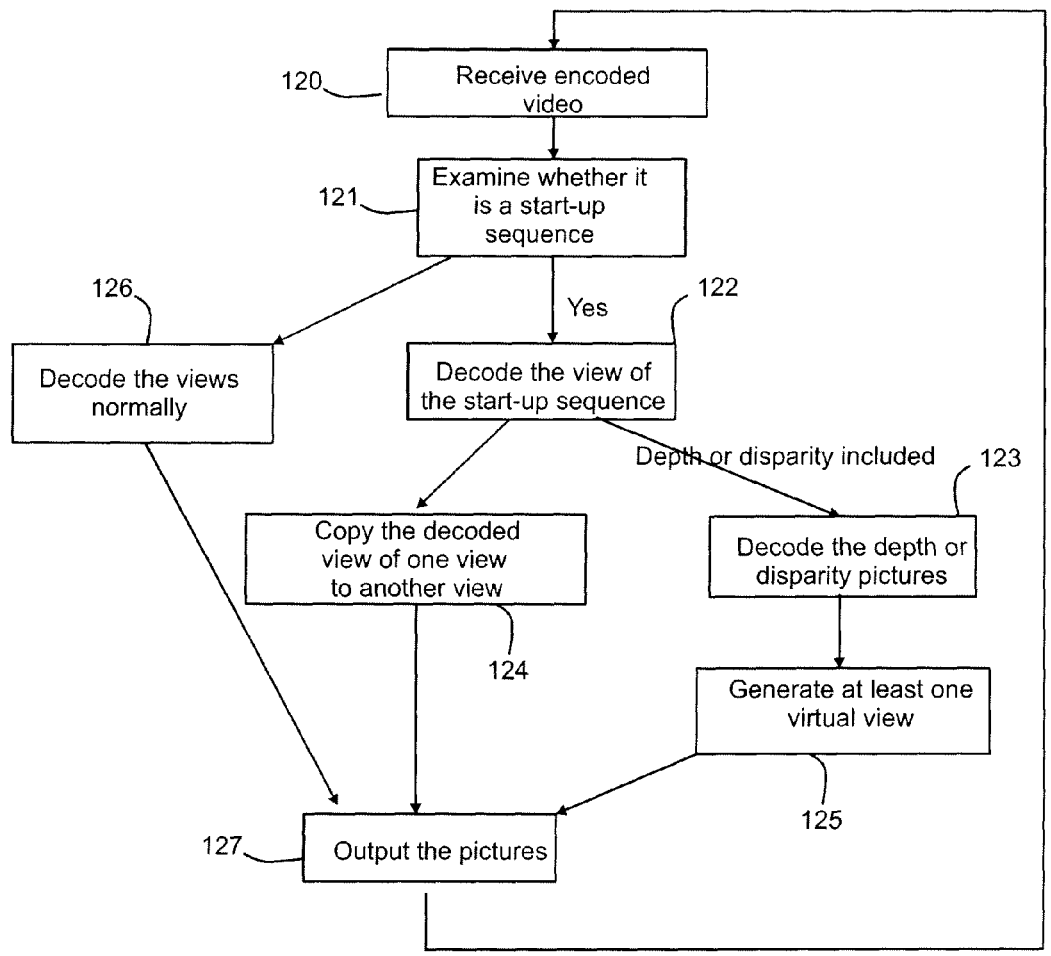
FIG. 12 depicts an example embodiment of a decoding method according to the present invention as a flow diagram.

In the following the operation of a decoder 6 according to an example embodiment of the present invention will be illustrated with reference to FIGS. 5 and 12. The device 5 receives for example from the communication network 4 transmission carrying video information encoded according to the invention (block 120 in FIG. 12). The transmission is received and transformed to encoded picture information by the receiver 5.1. Transforming of the received transmission to encoded picture information may include de-modulating as well as de-capsulating of protocol data units and their reassembly to service data units at different layers of the communication protocol stack in use. The receiver 5.1 may also receive one or more parameters, one or more messages or other signals carrying indication of the start-up sequence. This indication is examined by the start-up sequence detector 6.1 of the decoder 6 (block 121). However, as it was mentioned above, the start-up sequence need not always be signaled wherein the start-up sequence detector 6.1 can use other means to determine whether pictures belong to a start-up sequence or not. Alternatively, as illustrated in FIGS. 7b, 8b and 9b, the start-up sequence may have been encoded in such a manner that it can be decoded as a regular stereoscopic bitstream and hence the start-up sequence need not be detected and the start-up sequence detector 6.1 need not exist.

In normal operation the decoding block 6.3 decodes the received image information to video sequences of the left and right view. During the start-up sequence, information of only one view is normally received and decoded in the decoding block 6.3 (block 122). In addition to the texture pictures, the start-up sequence as well as the conventional bitstream may include respective coded depth or disparity pictures. The decoding block 6.3 usually also decodes the coded depth or disparity pictures, when they are present (block 123).

The physical camera separation between capturing devices 1.1 and 1.2 may not be ideal for the display 8 or for the preferences of the viewer. In normal operation, the view generation block 6.2 may adjust the disparity between the views that are rendered while the encoded views might be of different disparity. The view generation block 6.2 generates a virtual camera view replacing one of the coded camera views. The virtual camera view is at a desirable camera separation relative to the capturing device the view of which remains displayed. If depth or disparity maps are decoded and provided to the view generation block 6.2, any depth-image-based rendering method can be used for view generation.

As a response to a detected start-up sequence, the view generator 6.2 of the decoder 6 may operate in one of the following ways. First, the view generator 6.2 copies the decoded view component to both output views in response to detecting a start-up sequence (block 124). If the start-up sequence includes depth or disparity information, the depth or disparity information can be used in the decoder or renderer to synthesize views. Consequently, a second potential operation mode of the view generator 6.2 during a start-up sequence is to generate at least one virtual view (block 125). For example, two virtual views of a constant camera separation during the start-up sequence can be generated from one texture view and respective depth view. Another example is to gradually increase the virtual camera separation or disparity during the start-up sequence. Any view synthesis or depth-image-based rendering method can be used, or the to-be-applied view synthesis method can be indicated in the bit stream or in the encapsulation of the bit stream.

The way of operation of the view generator 6.2 during a start-up sequence may be indicated to the view generator 6.2. The indication may be created by the encoder 3 and included in the bit stream for example as a Supplemental Enhancement Information (SEI) message, or a part of any of a slice header, a picture header, a GOP header, a sequence header, a picture parameter set, or a sequence parameter set. The indication may also be included in a meta data or description structures of the file format encapsulating the coded bit stream, or included in a header structure, such as in the RTP payload header, used in the encapsulation or transport of the coded bit stream. Alternatively, the mode of operation for the view generator may be concluded by the start-up sequence detector 6.1 or the decoding block 6.3. The process of concluding the mode of operation for the view generator may be based on the maximum absolute disparity of the normal sequence, physical camera separation, display characteristics, and viewer's preferences, for example.

After the start-up sequence the decoder 6 decodes the views normally (block 126).

The renderer 7 outputs pictures onto the display or other output device at a correct pace with a suitable uncompressed picture format (block 127). The renderer 7 may also be capable of copying the pictures of a single view during the start-up sequence into both rendered views, hence making the use of the view generator 6.2 unnecessary for such an operation during the start-up sequence. The renderer 7 may perform color space conversion, such as a conversion from YUV to RGB color space. The renderer 7 may also perform pixel interleaving required by the display 8, such as row interleaving of left and right view pictures. In some embodiments, block 127 may be included as a part of the decoder 6 rather than in the renderer 7. In such embodiments, the block 127 outputs the pictures and views generated in blocks 124, 125, 126, and 127 through an interface. The interface may be an application programming interface, a shared memory buffer on a writable memory, or a physical device interface, for example.

In various embodiments, instead of or in addition to a depth map or image (typically for each coded texture picture), a disparity map can be used, where the disparity is indicated between the coded texture picture and a determined right view (and its respective camera position).

In addition to the texture pictures and the respective depth maps, a background texture picture and the respective depth can be coded into the bit stream. A background texture is usually such that it stays unchanged throughout the start-up sequence and should also contain areas that are uncovered when foreground objects move. Texture pictures and the respective depth maps might not cover the entire picture area, but some of the areas included in the background texture picture can be excluded. Such an arrangement can be realized with the so-called layered depth video (LDV) scheme.

In addition to stereoscopic video coding, the invention can be applied to multi-view video coding with more than two views.

In different embodiments of the invention, the number of coded views within the start-up sequence is smaller than the number of coded views outside the start-up sequence. Examples of the embodiments of the invention include:

- Only the mid-most view is coded during the start-up sequence. This coded view is displayed as the left view and the right view regardless of the viewing angle relative to the display.
- Only the mid-most stereo pair is coded during the start-up sequence. This coded stereo pair is displayed as the left view and the right view regardless of the viewing angle relative to the display.
- A subset of the views is encoded. For example, if the sequence is captured with seven cameras 1.1-1.7 (FIG. 11), only the five mid-most ones (1.2 . . . 1.6) may be coded. Two non-adjacent views are displayed at a time for a viewer, (1.1, 1.3), (1.2, 1.4), (1.3, 1.5), (1.4, 1.6) or (1.5, 1.7), allowing five viewing angles. Instead of these stereo pairs, a single view may be displayed for the user during the start-up sequence, i.e. (1.2, 1.2), (1.3, 1.3), (1.4, 1.4), (1.5, 1.5), or (1.6, 1.6), respectively.

The presented method is compatible with existing standards and can be implemented by encoder modifications only. On the other hand, somewhat more compression performance can be achieved, if the use of the presented method is indicated in the bit stream.

Figure 13:
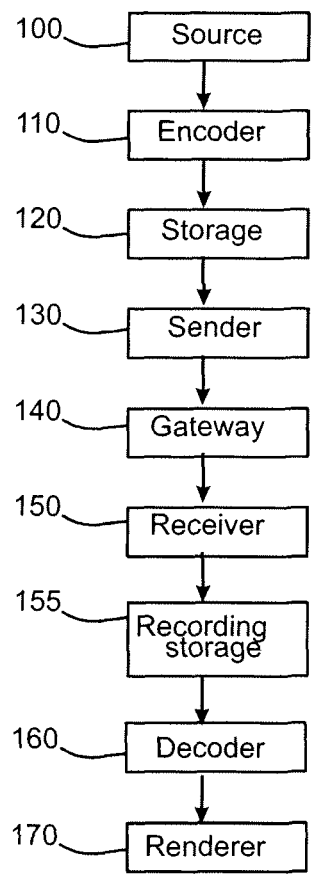
FIG. 13 depicts an example of a system in which the present invention can be applied.

FIG. 13 is a graphical representation of a generic multimedia communication system within which various embodiments may be implemented. As shown in FIG. 15, a data source 100 provides a source signal in an analog, uncompressed digital, or compressed digital format, or any combination of these formats. In various embodiments, the data source may be interpreted to comprise two or more video capturing devices 1.1, 1.2, 1.3. An encoder 110 encodes the source signal into a coded media bitstream. Generally, the encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. In various embodiments, the encoder 110 may comprise the encoding block 3.12 of FIG. 4 fully or partly. It should be noted, however, that typically real-time broadcast services comprise several streams (typically at least one audio, video and text sub-titling stream). It should also be noted that the system may include many encoders, but in FIG. 13 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should again be noted that a system may contain more than one sender 130, but for the sake of simplicity, the following description only considers one sender 130.

If the media content is encapsulated in a container file for the storage 120 or for inputting the data to the sender 130, the sender 130 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include Multipoint Conference Units (MCUs), gateways between circuit-switched and packet-switched video telephony, Push-to-talk over Cellular (PoC) servers, IP encapsulators in digital video broadcasting-handheld (DVB-H) systems, and set-top boxes that forward broadcast transmissions locally to home wireless networks. When RTP is used, the gateway 140 is called an RTP mixer or an RTP translator and typically acts as an endpoint of an RTP connection. It should be noted that the system may include many gateways, but in FIG. 13 only one gateway 140 is represented to simplify the description without a lack of generality.

It can be generally considered that the sender 130 transmits data to the receiver 150 through a transmission channel 4.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. In some systems, the receiver 150 does not decapsulate the transmitted signal, but the encapsulated packet stream is stored in the recording storage 155. If there are multiple coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream is typically processed further by a decoder 160, whose output is one or more uncompressed media streams. In various embodiments, the decoder 160 may comprise the decoder block 6 of FIG. 5 partly or fully. Finally, a renderer 170 may reproduce the uncompressed media streams with a loudspeaker or a display 180, for example. In various embodiments, the renderer 170 may comprise one or both of the rendering block 7 and the display 8. The receiver 150, recording storage 155, decoder 160, and renderer 170 may reside in the same physical device or they may be included in separate devices.

The present invention is not limited to the above described embodiments only but can be varied within the scope of the claims.

I claim:

1. A method for a device comprising:
receiving a first sequence of pictures from a first view and a second sequence of pictures from a second view, the first sequence of pictures and the second sequence of pictures covering a second period of pictures;
obtaining at least a third sequence of pictures of at least one view between the first view and the second view covering a first period of pictures; wherein no picture in the second period of pictures precedes any picture in the first period of pictures in output order;
encoding said at least the third sequence of pictures; and
encoding the first sequence of pictures and the second sequence of pictures.

2. The method according to claim 1 comprising:
obtaining said first sequence of pictures from a first video capturing device; and
obtaining said second sequence of pictures from a second video capturing device.

3. The method according to claim 2 comprising:
obtaining said at least the third sequence of pictures from a third video capturing device.

4. The method according to claim 1 comprising:
receiving or obtaining at least one of a fourth sequence of pictures from the first view, a fifth sequence of pictures from the second view, and the at least the third sequence of pictures, wherein the fourth sequence of pictures and the fifth sequence of pictures cover the first period of pictures;
examining said at least one of the fourth sequence of pictures, the fifth sequence of pictures, and the at least the third sequence of pictures; and
using said examining to determine whether said first period of pictures comprises a scene change; and
if so, encoding said at least the third sequence of pictures.

5. The method according to claim 1 comprising:
providing an indication of the encoding said at least the third sequence of pictures.

6. The method according to claim 1 comprising:
using a left view of a stereo video signal as said first view and a right view of the stereo video signal as said second view.

7. A method for a device comprising:
receiving an encoded sequence of pictures from at least one view among a first view, a second view and at least one third view between the first view and the second view;
decoding said encoded sequence of pictures;
examining whether said encoded sequence of pictures represents said at least one third view; and
if the examining indicates that said encoded sequence of pictures represents said at least one third view, generating a rendered first view and a rendered second view on the basis of said decoded sequence of pictures.

8. The method according to claim 7 comprising:
copying said decoded sequence of pictures to pictures of said rendered first view and to pictures of said rendered second view.

9. The method according to claim 7 wherein
said examining comprises receiving and interpreting an indication of whether the at least one third view is represented in said encoded sequence of pictures.

10. The method according to claim 7 wherein
said examining comprises concluding that said encoded sequence of pictures represents said at least one third view when exactly one view is present in said encoded sequence of pictures.

11. An apparatus comprising:
at least a processor, a memory operatively connected to the processor and having computer coded instructions stored therein, said instructions when executed by the processor causing the apparatus to perform:
receiving a first sequence of pictures from a first view and
receiving a second sequence of pictures from a second view, the first sequence of pictures and the second sequence of pictures covering a second period of pictures;
obtaining at least a third sequence of pictures of at least one view between the first view and the second view covering a first period of pictures, wherein no picture in the second period of pictures precedes any picture in the first period of pictures in output order;
encoding said at least the third sequence of pictures; and
encoding the first sequence of pictures and the second sequence of pictures.

12. The apparatus according to claim 11, further comprising instructions causing the apparatus to perform:
obtaining said first sequence of pictures from a first video capturing device; and
obtaining said second sequence of pictures from a second video capturing device.

13. The apparatus according to claim 12, further comprising instructions causing the apparatus to perform:
obtaining said at least the third sequence of pictures from a third video capturing device.

14. The apparatus according to claim 11, further comprising instructions causing the apparatus to perform:
receiving or obtaining at least one of a fourth sequence of pictures from the first view, a fifth sequence of pictures from the second view, and the at least the third sequence of pictures, wherein the fourth sequence of pictures and the fifth sequence of pictures cover the first period of pictures;
examining said at least one of the fourth sequence of pictures, the fifth sequence of pictures, and the at least the third sequence of pictures; and
using said examining to determine whether said first sequence of pictures comprises a scene change; and
if so, encoding said at least the third sequence of pictures.

15. The apparatus according to claim 11, further comprising instructions causing the apparatus to perform:
   providing an indication of the encoding said at least the third sequence of pictures.

16. The apparatus according to claim 11, further comprising instructions causing the apparatus to perform:
   using a left view of a stereo video signal as said first view and a right view of the stereo video signal as said second view.

17. An apparatus comprising at least a processor, a memory operatively connected to the processor and having computer coded instructions stored therein, said instructions when executed by the processor causing the apparatus to perform:
   receiving an encoded sequence of pictures from at least one view among a first view, a second view and at least one third view between the first view and the second view;
   decoding said encoded sequence of pictures;
   examining whether said encoded sequence of pictures represents said at least one third view; and
   if the examining indicates that said encoded sequence of pictures represents said at least one third view, generating a rendered first view and a rendered second view on the basis of said decoded sequence of pictures.

18. The apparatus according to claim 17, further comprising instructions causing the apparatus to perform:
   copying said decoded sequence of pictures to pictures of said rendered first view and to pictures of said rendered second view.

19. The apparatus according to claim 17, wherein
   said examining comprises receiving and interpreting an indication of whether the at least one third view is represented in said encoded sequence of pictures.

20. The apparatus according to claim 17, wherein said examining comprises concluding that said encoded sequence of pictures represents said at least one third view when exactly one view is present in said encoded sequence of pictures.

21. A computer program product having non-transitory program code stored therein, said program code comprising instructions when executed by a processor performs the following:
   receiving a first sequence of pictures from a first view and a second sequence of pictures from a second view, the first sequence of pictures and the second sequence of pictures covering a second period of pictures;
   obtaining at least a third sequence of pictures of at least one view between the first view and the second view covering a first period of pictures;
   wherein no picture in the second period of pictures precedes any picture in the first period of pictures in output order;
   encoding said at least the third sequence of pictures; and
   encoding the first sequence of pictures and the second sequence of pictures.

22. A computer program product having non-transitory program code stored therein, said program code comprising instructions when executed by a processor performs the following:
   receiving an encoded sequence of pictures from at least one view among a first view, a second view and at least one third view between the first view and the second view;
   decoding said encoded sequence of pictures;
   examining whether said encoded sequence of pictures represents said at least one third view; and
   if the examining indicates that said encoded sequence of pictures represents said at least one third view, generating a rendered first view and a rendered second view on the basis of said decoded sequence of pictures.

23. An apparatus comprising:
   means for receiving a first sequence of pictures from a first view; and for receiving a second sequence of pictures from a second view, the first sequence of pictures and the second sequence of pictures covering a second period of pictures;
   means for obtaining at least a third sequence of pictures of at least one view between the first view and the second view covering a first period of pictures, wherein no picture in the second period of pictures precedes any picture in the first period of pictures in output order;
   means for encoding said at least the third sequence of pictures; and
   means for encoding the first sequence of pictures and the second sequence of pictures.

24. An apparatus comprising:
   means for receiving an encoded sequence of pictures from at least one view among a first view, a second view and at least one third view between the first view and the second view;
   means for decoding said encoded sequence of pictures;
   means for examining whether said encoded sequence of pictures represents said at least one third view; and
   means for generating a rendered first view and a rendered second view on the basis of said decoded sequence of pictures, if the examining indicates that said encoded sequence of pictures represents said at least one third view.

* * * * *